United States Patent
Razoumov et al.

(10) Patent No.: US 6,771,700 B1
(45) Date of Patent: Aug. 3, 2004

(54) METHOD AND APPARATUS FOR MINIMIZING TOTAL TRANSMISSION ENERGY IN A COMMUNICATION SYSTEM EMPLOYING RETRANSMISSION OF FRAME RECEIVED IN ERROR

(75) Inventors: Leonid Razoumov, San Diego, CA (US); Jack Holtzman, San Diego, CA (US); Stein A. Lundby, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/426,016

(22) Filed: Oct. 22, 1999

Related U.S. Application Data

(60) Provisional application No. 60/158,446, filed on Oct. 9, 1999.

(51) Int. Cl.$^7$ .............................. H04B 3/45; H04B 7/00
(52) U.S. Cl. ...................................... 375/227; 455/522
(58) Field of Search .................................. 375/227, 285, 375/219, 254, 341, 222; 455/522, 69, 442, 70, 67.1; 370/228, 328, 331, 335, 342, 479, 333, 468, 470; 714/18, 1, 748, 708, 794, 795

(56) References Cited

U.S. PATENT DOCUMENTS

| | | | |
|---|---|---|---|
| 4,901,307 A | | 2/1990 | Gilhousen et al. ............ 370/18 |
| 5,101,501 A | | 3/1992 | Gilhousen et al. ............ 455/33 |
| 5,103,459 A | | 4/1992 | Gilhousen et al. ............. 375/1 |
| 5,109,390 A | | 4/1992 | Gilhousen et al. ............. 375/1 |
| 5,842,113 A | * | 11/1998 | Nanda et al. .................. 455/69 |
| 5,893,035 A | | 4/1999 | Chen ......................... 455/322 |
| 6,034,971 A | * | 3/2000 | Love et al. ................. 370/468 |
| 6,085,108 A | * | 7/2000 | Knutsson et al. ........... 455/522 |
| 6,101,168 A | * | 8/2000 | Chen et al. .................. 370/228 |
| 6,151,696 A | * | 11/2000 | Miller et al. ................. 714/748 |
| 6,163,570 A | * | 12/2000 | Olafsson ..................... 375/223 |

FOREIGN PATENT DOCUMENTS

EP 0899906 3/1999

OTHER PUBLICATIONS

TIA/EIA/IS–707–A.8 Data Service Options for Spread Spectrum Systems: Radio Link Protocol Type 2 pgs. 1–1:4–12 (Mar., 1999).

TIA/EIA/IS–707–A.1.10 Data Service Options for Spread Spectrum Systems: Radio Link Protocol Type 3 pgs. 1–1:4–17 (Dec., 1999).

* cited by examiner

*Primary Examiner*—Khai Tran
(74) *Attorney, Agent, or Firm*—Philip Wadsworth; Thien T. Nguyen; Pavel Kalousek

(57) ABSTRACT

Method and apparatus for transmitting a signal at a predetermined level of reliability using retransmission of erroneously transmitted frames so as to minimize total transmission energy. The transmitting station evaluates the frame error rate (FER) as a function of energy. Next, the transmitting station determines a combination of initial transmission energies and retransmission energies that will provide the target level of reliability while minimizing the total transmission energy employed in the initial transmission and the retransmissions. The transmitting station transmits a frame with an initial transmission energy. Employing conventional feedback methods the transmitting station is alerted to the occurrence of frame errors at the receiving station. The transmitting station upon notification of a frame error retransmits the frame with an energy determined to minimize the total energy required to transmit the frame with a predetermined level of reliability.

30 Claims, 2 Drawing Sheets

METHOD AND APPARATUS FOR MINIMIZING TOTAL TRANSMISSION ENERGY IN A COMMUNICATION SYSTEM EMPLOYING RETRANSMISSION OF FRAME RECEIVED IN ERROR

CROSS REFERENCE INFORMATION

This application is claiming priority from Provisional Application Serial No. 60/158,446, filed Oct. 9, 1999.

BACKGROUND OF THE INVENTION

I. Field of the Invention

The current invention relates to communications. More particularly, the present invention relates to a method and apparatus for minimizing the total energy necessary for transmitting an information signal at a required level of reliability.

II. Description of the Related Art

The use of code division multiple access (CDMA) modulation techniques is one of several techniques for facilitating communications in which a large number of system users are present. Although other techniques such as time division multiple access (TDMA), frequency division multiple access (FDMA), and AM modulation schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein. The CDMA system can be designed to conform to the "TIA/EIA/IS-95 Mobile Station-Base Station Compatibility Standard for Dual-Mode Wideband Spread Spectrum Cellular System", hereinafter referred to as the IS-95 standard.

The CDMA system is a spread spectrum communication system. The benefits of spread spectrum communication are well known in the art and can be appreciated by reference to the above-cited references. CDMA, by its inherent nature of being a wideband signal, offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links to a mobile user or remote station through two or more base stations. Furthermore, path diversity may be obtained by exploiting the multipath environment through spread spectrum processing by allowing signals arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention and incorporated by reference herein.

Code division multiple access communications systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", incorporated by reference herein, and hereinafter referred to as IS-95-B.

IS-95-B was originally optimized for transmission of variable-rate voice frames. In order to support two-way voice communications, as typified in wireless phone applications, it is desirable that a communication system provide fairly constant and minimal data delay. For this reason, IS-95-B systems are designed with powerful forward error correction (FEC) protocols and vocoders which are designed to respond gracefully to voice frame errors. Error control protocols which require frame retransmission procedures add unacceptable delays to voice transmission, so are not designed into the IS-95-B specification.

The optimizations, which make the stand-alone IS-95-B specification ideal for voice applications, make it difficult to use for packet data applications. In many non-voice applications, such as the transmission of Internet protocol (IP) data, the delay requirements of the communication system are much less stringent than in voice applications. In the Transmission Control Protocol (TCP), probably the most prevalent of protocols used in an IP network, virtually infinite transmission delays are allowed in order to guarantee error-free transmission. TCP uses retransmissions of IP datagrams, as IP packets are commonly called, to provide this transport reliability.

IP datagrams are generally too large to fit into a single IS-95-B frame. Even after dividing an IP datagram into segments small enough to fit into a set of IS-95-B frames, the entire set of IS-95-B frames would have to be received without error for the single IP datagram to be useful to TCP. The targeted frame error rate typical of an IS-95-B system make the probability of error-free reception of all segments of a single datagram very low.

As described in IS-95-B, alternative service options enable the transmission of other types of data in lieu of voice frames. Telecommunications Industry Association Interim Standard TIA/EIA/IS-707-A, entitled "DATA SERVICE OPTIONS FOR SPREAD SPECTRUM SYSTEMS", hereinafter referred to as IS-707, describes a set of procedures used in the transmission of packet data in an IS-95-B system.

Radio Link Protocol (RLP) is described in TIA/EIA/IS-707-A.8, entitled "DATA SERVICE OPTIONS FOR SPREAD SPECTRUM SYSTEMS: RADIO LINK PROTOCOL TYPE 2", hereinafter referred to as RLP2, and incorporated herein by reference. RLP2 incorporates an error control protocol with frame retransmission procedures over the IS-95-B frame layer. RLP is of a class of error control protocols known NAK-based ARQ protocols, which are well known in the art. The IS-707 RLP, facilitates the transmission of a byte-stream, rather than a series of voice frames, through an IS-95-B communication system.

Several protocol layers typically reside above the RLP layer. IP datagrams, for example, are typically converted into a Point-To-Point Protocol (PPP) byte stream before being presented as a byte stream to the RLP protocol layer. As the RLP layer ignores the protocol and framing of higher protocol layers, the stream of data transported by RLP is said to be a "featureless byte stream".

RLP was originally designed to satisfy the requirements of sending large datagrams through an IS-95-B channel. For example, if an IP datagram of 500 bytes were to be simply sent in IS-95-B frames carrying 20 bytes each, the IP datagram would fill 25 consecutive IS-95-B frames. Without some kind of error control layer, all 25 of these RLP frames would have to be received without error in order for the IP datagram to be useful to higher protocol layers. On an IS-95-B channel having a 1% frame error rate, the effective error rate of the IP datagram delivery would be $(1-(0.99)^{25})$, or 22%. This is a very high error rate compared to most networks used to carry Internet Protocol traffic. RLP was designed as a link layer protocol that would decrease the error rate of IP traffic to be comparable to the error rate typical of a 10Base2 ethernet channel.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission. The Telecommunications Industry Association is currently developing the cdma2000 proposal as interim standard TIA/EIA/IS-2000, and hereinafter referred to as cdma2000. A second of these proposals was issued by the European Telecommunications Standards Institute (ETSI), entitled "The ETSI UMTS Terrestrial Radio Access (UTRA) ITU-R RTT Candidate Submission", also known as "wideband CDMA" and hereinafter referred to as W-CDMA. A third proposal was submitted by U.S. TG 8/1 entitled "The UWC-136 Candidate Submission", hereinafter referred to as EDGE. The contents of these submissions is public record and is well known in the art.

RLP2 was designed for use with IS-95-B. A new RLP designed for use with cdma2000 is described in TIA/EIA/IS-707-A-1.10, entitled "DATA SERVICE OPTIONS FOR SPREAD SPECTRUM SYSTEMS: RADIO LINK PROTOCOL TYPE 3", hereinafter referred to as RLP3E, and incorporated herein by reference.

SUMMARY OF THE INVENTION

The present invention is a novel method and apparatus for transmitting a signal at a predetermined level of reliability using retransmission of erroneously transmitted frames. The present invention describes a method of maximally efficient transmission in terms of transmission energy in a system employing retransmission of erroneously received frames of data.

The transmitting station evaluates the frame error rate (FER) as a function of energy. In one embodiment, the transmitting station adaptively evaluates feedback information received from the receiving station. In another embodiment, the transmitting station evaluates conditions of a transmission channel, e.g., attenuation, fading, number of multipaths, relative velocity of the RS and the BS, data rate. The transmitting station then uses a look-up table, containing simulated FER as a function of energy for all potential channel conditions, to select the proper relationship for given conditions.

Next, the transmitting station determines a combination of initial transmission energies and retransmission energies that will provide the target level of reliability while minimizing the total transmission energy employed in the initial transmission and the retransmissions. The present invention provides a closed form solution for determining the most effective transmission energies for the initial transmission and the retransmission for an important class of functions describing the relation between FER and energy. The present invention further suggests methods for determining the most effective transmission energies for the initial transmission and the retransmission for other classes of functions describing the relation between FER and energy.

The transmitting station transmits a frame with initial transmission energy. Employing conventional feedback methods, the transmitting station is alerted to the occurrence of frame errors at the receiving station. The transmitting station upon notification of a frame error retransmits the frame with energy determined to minimize the total energy required to transmit the frame with a predetermined level of reliability.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
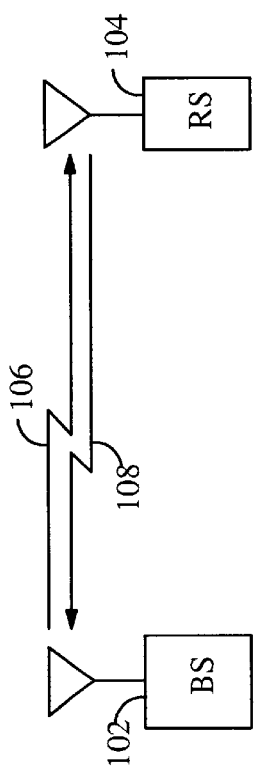
FIG. 1 is a conceptual drawing showing an exemplifying embodiment of a terrestrial wireless communication system.

FIG. 1 shows an exemplifying embodiment of a terrestrial wireless communication system, represented by a base-station (BS) 102 and a remote-station (RS) 104, communicating over a forward link 106, carrying information from BS 102 to RS 104, and a reverse link 108, carrying information from RS 104 to BS 102. Information communicated between BS 102 and RS 104 is required to meet a predetermined reliability level. In the exemplary, embodiment the information on forward link signal 106 is transmitted in frames and the required reliability level is expressed as a target frame error rate (FER) as received by RS 104.

One method of achieving the required FER is retransmission. A transmitting station transmits information, contained in frames, with a first energy ($E_1$). The transmitted information is received by a receiving station with a first FER1. The receiving station reports the first FER1 and identity of those frames received in error back to the transmitting station. The transmitting station selects a second transmission energy ($E_2$), and re-transmits the frames received in error. The receiving station receives the frames with a second FER2. When the energies $E_1$ and $E_2$ are properly selected, the effective FER after the second transmission will be equal to the target FER.

There are infinite number of combinations of $E_1$ and $E_2$ assuring the effective FER is equal to the target FER. Because communications systems, and CDMA communication systems in particular, are noise limited, it is advantageous to choose $E_1$ and $E_2$ in a manner yielding minimum total transmission energy. The total transmission energy, <E>, is equal to the energy used for the first transmission plus the energy for retransmission of those frames initially received in error:

$$<E>=E_1+f(E_1)\cdot E_2, \tag{1}$$

where $E_1$ is energy for the first transmission, $E_2$ is energy for retransmission, and $f(E_1)$ is a frame error rate for transmission with energy $E_1$. The condition that the effective FER be equal to the target FER can be expressed as:

$$T_{FER}=f(E_1)\cdot f(E_2), \tag{2}$$

where $T_{FER}$ is the target frame error rate and the effective frame error rate is the product of, $f(E_1)$ is a frame error rate for transmission with energy $E_1$, and $f(E_2)$ is a frame error rate for transmission with energy $E_2$.

Thus, the task of selecting $E_1$ and $E_2$ for minimal total energy <E>, while assuring that effective FER after the second transmission will be equal to the target FER, is equivalent to solving equation (1) subject to a constraint (2). Any method of solving the equation (1) subject to a constraint (2) requires the knowledge of a FER as a function of energy or a measure of energy as illustrated in equation (3).

$$FER = f(E), \quad (3)$$

where the energy measure E may for example be the energy-per-bit over noise $$\left(\frac{E_b}{N_0}\right).$$

This relationship is a function of several variables, including, but not being limited to attenuation, fading, number of multipaths, relative velocity of RS 104 and BS 102.

Once the relationship of equation (3) has been determined, various methods can be used to solve equation (1) subject to the constraint expressed in equation (2). Thus, for and important class of functions, an analytical solution is obtainable. However, one ordinarily skilled in the art will readily recognize that the equation (1) subject to the constraint expressed in equation (2) is always solvable employing numerical methods. In one approach toward analytical solution, it is convenient to change the scale from linear to logarithmic coordinates. First, equations (1) is normalized by introducing an arbitrary constant energy scale $E_0$.

$$\left\langle \frac{E}{E_0} \right\rangle = \frac{E_1}{E_0} + f(E_1) \cdot \frac{E_2}{E_0}. \quad (4)$$

Because the frame error rate can assume values between 0 and 1, the logarithmic coordinates are then defined as:

$$x = \ln f(E), \quad x \in (-\infty, 0) \quad (5)$$

$$y = \ln\left(\frac{E}{E_0}\right), \quad y \in (-\infty, \infty) \quad (6)$$

Substituting (5) and (6) into (4) and (2) yields:

$$\left\langle \frac{E}{E_0} \right\rangle = e^{y_1} + e^{(x_1 + y_2)} \quad (7)$$

$$\ln T_{FER} = x_1 + x_2 \quad (8)$$

The dependence of equation (7) on x2 can be eliminated by substitution using equation (8). The stationary point of the total energy as described in equation (7) can be determined taking the derivative of Equation 7 with respect to $x_1$ and equating it to zero:

$$\frac{d\left\langle \frac{E}{E_0} \right\rangle}{dx_1} = e^{y_1} y_1' + e^{(x_1 + y_2)} \cdot (1 - y_2') = 0, \quad (9)$$

where $y_1'$ is the derivative of $y_1$ with respect to $x_1$, and $y_2'$ is the derivative of $y_2$ with respect to $x_2$. Once the stationary point of the total energy is obtained from equation (9), a second derivative of equation (7) is computed and compared to zero, to guarantee that the stationary point of the total energy is a minimum:

$$\frac{d^2\left\langle \frac{E}{E_0} \right\rangle}{dx_1} = e^{y_1} \cdot (y_1'^2 + y_1'') + e^{(x_1 + y_2)} \cdot ((1 - y_2')^2 + y_2'') > 0, \quad (10)$$

where $y_1''$ is the second derivative of $y_1$ with respect to $x_1$, and $y_2''$ is the second derivative of $y_2$ with respect to $x_2$.

For many realistic channel conditions the FER is a power-like function of energy:

$$f(E) = f_0 \left(\frac{E}{E_0}\right)^{-\gamma} \quad (11)$$

Transformation of Equation (11) in accordance with equations (5) and (6) yields:

$$y = (x_0 - x)/\gamma, \quad (12)$$

where $x_0 = \ln f_0$ and equations (7) and (8) are substantially simplified because:

$$y_1' = y_1' = -\frac{1}{\gamma} \quad (13)$$

$$y'' = 0 \quad (14)$$

Substituting equations (13) and (14) into equations (7) and (8), and solving equations (7) and (8) yields a closed form solution:

$$x_1 = \frac{[\ln T_{FER} - \gamma \cdot \ln(\gamma + 1)]}{\gamma + 2} \quad (15)$$

$$x_2 = \ln - T_{FER} - x_1 \quad (16)$$

$$y_1 = \frac{(\gamma + 1) \cdot \ln T_{FER} + \gamma \cdot \ln(\gamma + 1)}{\gamma \cdot (\gamma + 2)} \quad (17)$$

$$y_2 = y_1 - \frac{\ln[T_{FER} \cdot (\gamma + 1)^2]}{(\gamma + 2)} \quad (18)$$

$$\ln\left(\left\langle\frac{E}{E_0}\right\rangle_{min}\right) = y_1 + \ln\left(\frac{\gamma + 2}{\gamma + 1}\right) \quad (19)$$

Interpretation of Equation 19 clarifies that retransmission in accordance with the above outlined principles is advantageous if Equation 20 holds:

$$f(E_1) \cdot f(E_2) \geq f(E_1 + f(E_1) \cdot E_2) \quad (20)$$

If Equation 20 does not hold, it is more advantageous to transmit:

$$<E> = f(E_1 + f(E_1) \cdot E_2) \quad (21)$$

This happens for very large values of γ.

Although the retransmission method, and its mathematical treatment was simplified for tutorial purposes to one transmission, and one retransmission, the principle is readily extendable to any arbitrary number (N) retransmissions. One ordinarily skilled in the art will readily modify equation (1) to multiple retransmissions as follows:

$$\langle E \rangle = E_1 + f(E_1) \cdot E_2 + f(E_1) \cdot f(E_2) \cdot E_3 + \ldots + E_N \prod_{i=1}^{N-1} f(E_i) \quad (22)$$

Similarly equation 2 for multiple retransmission takes the form:

$$T_{FER} = \prod_{i=1}^{N} f(E_i) \quad (23)$$

Figure 2:
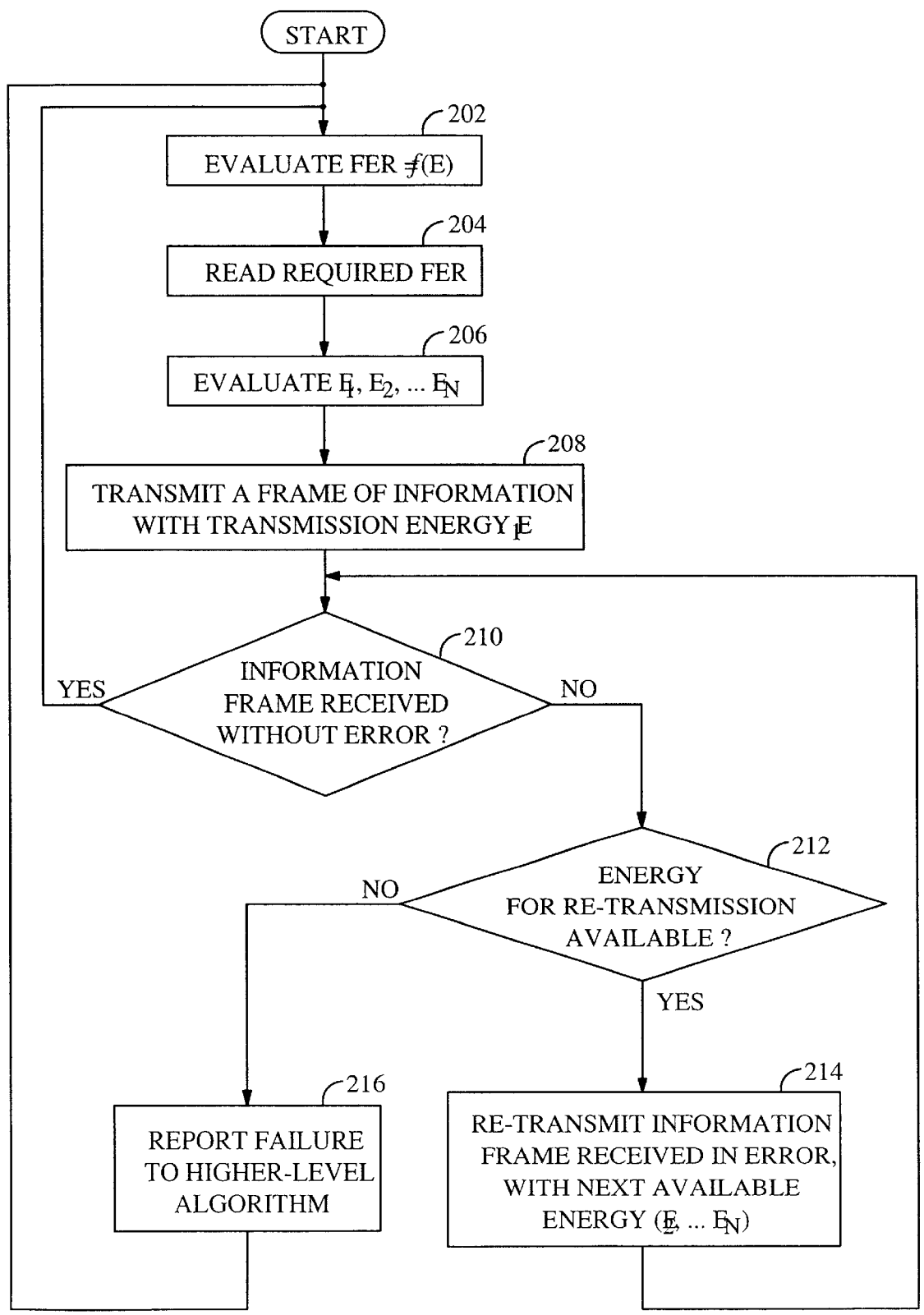
FIG. 2 is a flowchart illustrating the process of accomplishing minimization of total retransmission energy in accordance with one embodiment of the invention.

FIG. 2 is a flowchart showing load estimation in accordance with the invention. Flow begins in block 202 in which the transmitting station evaluates FER as a function of energy. In one embodiment, the transmitting station adaptively evaluates feedback information received from the receiving station. In another embodiment, the transmitting station evaluates conditions of a transmission channel, e.g., attenuation, fading, number of multipaths, relative velocity of the RS and the BS, data rate. The transmitting station then uses a look-up table, containing simulated FER as a function of energy for all potential channel conditions, to select the proper relationship for given conditions.

In block 204, the transmitting station reads the required FER.

In block 206, the transmitting station evaluates the transmission energy for initial transmission $E_1$, and potential retransmissions $E_2, \ldots E_N$, in accordance with the principles outlined above. Thus, the transmitting station can use a pre-computed solution similar to equations 15 through 19 in a form of look-up table when appropriate, or algorithms solving Equations 22 and 23 by analytical or numerical methods.

In block 208, the transmitting station transmits a frame of the information with transmission energy set to a value of $E_1$.

In block 210, the transmitting station evaluates whether the information frame transmitted was received without error. If the report from the receiving station is positive, the flow restarts in block 202. If the report from the receiving station is negative, the transmitting station evaluates in block 212, whether there is another transmission energy $E_2, \ldots E_N$. If the result of evaluation is positive, the transmitting station continues in block 214, by re-transmitting information frames that had been received in error with the next available energy, and the flow returns to block 210. If the result of evaluation is negative, the transmitting station reports the failure to a higher level algorithm in block 216, and the flow continues in block 202.

Figure 3:
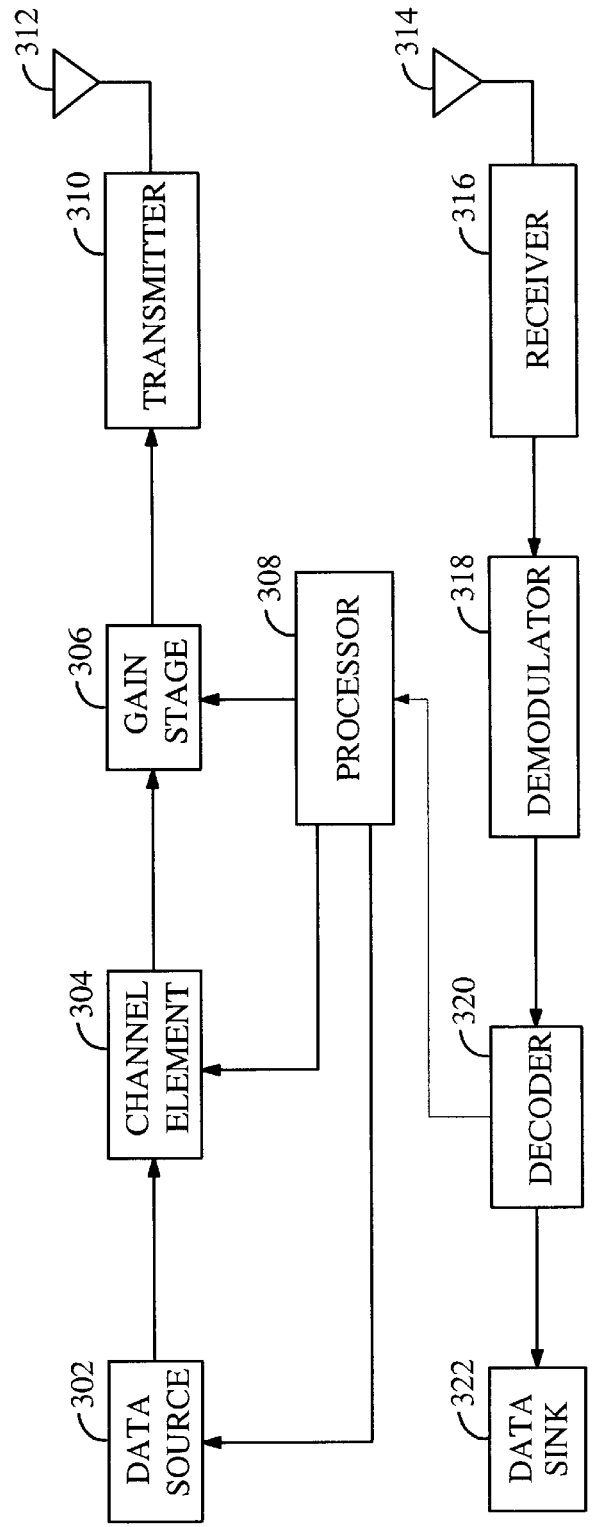
FIG. 3 is a block diagram of an exemplary embodiment of a transmitting station configured for use in connection with the invention.

FIG. 3 is a block diagram of an exemplary embodiment of a transmitting station configured for use in connection with the invention. The information to be transmitted is generated by a data source 302, and is provided to a channel element 304, which partitions the data, CRC encodes the data, and inserts code tail bits as required by the system. Channel element 304 then convolutionally encodes the data, CRC parity bits, and code tail bits, interleaves the encoded data, scrambles the interleaved data with the user long PN sequence, and covers the scrambled data with a Walsh sequence. The channel element 304 then provides the covered data to a gain stage 306, which scales the data in response to a signal from a processor 308, such that the data with required energy $E_1$ is provided to a transmitter 310. The transmitter 310 spreads the scaled data with the short $PN_I$ and $PN_Q$ sequences. The spread data is then modulated with the in-phase and quadrature sinusoids, and modulated signal is filtered, upconverted, and amplified. The signal is transmitted on over the forward channel 106 if the transmitting station is a BS, or reverse channel 108 if the transmitting station is a RS through antenna 312.

The feedback signal from the receiving station is received by an antenna 314, and is provided to a receiver 316. Receiver 316 filters, amplifies, downconverts, quadrature demodulates, and quantizes the signal. The digitized data is provided to demodulator 318 which despreads the data with the short PNI and PNQ sequences, decovers the despread data with the Walsh sequence. The despread data from different correlators within demodulator 318 are combined and descrambled with the user long PN sequence. The descrambled (or demodulated) data is provided to decoder 320 which performs the inverse of the encoding performed within channel element 304. The decoded data is provided to data sink 322, and the processor 308.

Processor 308 is configured to perform functions described in blocks 202, 204 and 206. It then controls gain stage 306 to scale the data to be transmitted to a power as determined in step 206, thus accomplishing a function described in block 208. Processor 308 is configured to perform function described in blocks 210 based on an information provided by the decoder 320 whether the transmission was received at the receiving station without error. Processor 308 is further configured to perform the decision function described in block 212, and based on the result of the decision report failure as in block 216, or cause the data source 302 together with the channel element 304, and the gain stage 318 to re-transmit information frames that had been received in error with the next available energy as required by block 214.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for retransmission in a communication system, comprising the steps of:

determining a plurality of transmission energies in accordance with a predetermined reliability level and at least one characteristic of a communication channel, comprising the steps of:
measuring said at least one of characteristic of said communication channel; and
utilizing a look-up table to select pre-computed transmission energies corresponding to said measured characteristic and said reliability level;

transmitting a frame of information at a first transmission energy; and retransmitting said frame of information at a next transmission energy from said plurality of transmission energies when said frame was received in error.

2. The method of claim 1, wherein said pre-computed transmission energies were pre-computed by the steps of:

solving for a minimal total energy <E>, an equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
$E_i$ are said transmission energies;
$f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate.

3. A method for retransmission in a communication system, comprising the steps of:
   determining a plurality of transmission energies in accordance with a predetermined reliability level and at least one characteristic of a communication channel, comprising the steps of:
      measuring at least one of said characteristic of said communication channel;
      utilizing a look-up table to select a predetermined relationship between a frame error rate and a transmission energy corresponding to said measured parameters;
      solving for a minimal total energy <E> in accordance with the equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
   $E_i$ are said transmission energies,
   $f(E_i)$ are frame error rates corresponding to said transmission energies $E_i$;
   subject to constraint:

$$T_{FER} = \prod_{i=1}^{N} f(E_i),$$

where: $T_{FRR}$ is a target frame error rate; and
   wherein said reliability level corresponds to said target frame error rate;
   transmitting a frame of information at a first transmission energy; and
   retransmitting said frame of information at a next transmission energy from said plurality of transmission energies when said frame was received in error.

4. A method for retransmission in a communication system, comprising the steps of:
   determining a plurality of transmission energies in accordance with a predetermined reliability level and at least one characteristic of a communication channel, comprising the step of:
      determining a relationship between a frame error rate and a transmitting energy;
      solving for a minimal total energy <E>, in accordance with the equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
   $E_i$ are said transmission energies, and
   $f(E_i)$ are frame error rates corresponding to said transmission energies $E_i$;
   subject to constraint:

$$T_{FER} = \prod_{i=1}^{N} f(E_i),$$

where: $T_{FRR}$ is a target frame error rate; and
   wherein said reliability level corresponds to said target frame error rate;
   transmitting a frame of information at a first transmission energy; and
   retransmitting said frame of information at a next transmission energy from said plurality of transmission energies when said frame was received in error.

5. A method, for retransmission in a communication system, comprising the steps of:
   determining two transmission energies in accordance with a predetermined reliability level and at least one characteristic of a communication channel;
   transmitting a frame of information at a first transmission energy; and
   retransmitting said frame of information at a next transmission energy from said plurality of transmission energies when said frame was received in error.

6. A method for retransmission in a communication system, comprising the steps of:
   determining a plurality of transmission energies in accordance with an equation for estimating a minimum aggregate transmission energy;
   transmitting a frame of information at a first transmission energy; and
   retransmitting said frame of information at a next transmission energy from said plurality of transmission energies when said frame was received in error.

7. An apparatus for retransmission in a communication system, comprising:
   a control processor configured to:
      determine a plurality of transmission energies in accordance with a predetermined reliability level and at least one characteristic of a communication channel by:
         measuring said at least one of characteristic of said communication channel; and
         utilizing a look-up table to select pre-computed transmission energies corresponding to said measured characteristic and said reliability level;
      provide a first set of signals indicative of a first transmission energy of said plurality of transmission energies for a frame of information; and
      provide at least one additional set of signals indicative of next transmission energy of said plurality of transmission energies for retransmitting said frame of information when said frame of information was received in error.

8. The apparatus of claim 7, wherein said control processor pre-computes said transmission energies by having been configured to:

solve for a minimal total energy <E>, an equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
$E_i$ are said transmission energies;
$f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate.

9. An apparatus for retransmission in a communication system, comprising:
a control processor configured to:
determine a plurality of transmission energies in accordance with a predetermined reliability level and at least one characteristic of a communication channel by:
measuring at least one of said characteristic of said communication channel;
utilizing a look-up table to select a predetermined relationship between a frame error rate and a transmission energy corresponding to said measured parameters;
solving for a minimal total energy <E> in accordance with the equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
$E_i$ are said transmission energies,
$f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate;
provide a first set of signals indicative of a first transmission energy of said plurality of transmission energies for a frame of information; and
provide at least one additional set of signals indicative of next transmission energy of said plurality of transmission energies for retransmitting said frame of information when said frame of information was received in error.

10. An apparatus for retransmission in a communication system, comprising:
a control processor configured to:
determine a plurality of transmission energies in accordance with a predetermined reliability level and at least one characteristic of a communication channel by:
determining a relationship between a frame error rate and a transmitting energy;
solving for a minimal total energy <E>, in accordance with the equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
$E_i$ are said transmission energies, and
$f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate;
provide a first set of signals indicative of a first transmission energy of said plurality of transmission energies for a frame of information; and
provide at least one additional set of signals indicative of next transmission energy of said plurality of transmission energies for retransmitting said frame of information when said frame of information was received in error.

11. An apparatus for retransmission in a communication system, comprising:
a control processor configured to:
determine two transmission energies in accordance with a predetermined reliability level and at least one characteristic of a communication channel;
provide a first set of signals indicative of a first transmission energy of said plurality of transmission energies for a frame of information; and
provide at least one additional set of signals indicative of next transmission energy of said plurality of transmission energies for retransmitting said frame of information when said frame of information was received in error.

12. An apparatus for retransmission in a communication system, comprising:
a control processor configured to:
determine a plurality of transmission energies by solving an equation for estimating a minimum aggregate transmission energy;
provide a first set of signals indicative of a first transmission energy of said plurality of transmission energies for a frame of information; and
provide at least one additional set of signals indicative of next transmission energy of said plurality of transmission energies for retransmitting said frame of information when said frame of information was received in error.

13. An apparatus for retransmission in a communication system, comprising:
a control processor configured to:
determine a plurality of transmission energies in accordance with a predetermined reliability level and at least one characteristic of a communication channel by:
measuring said at least one of characteristic of said communication channel; and
utilizing a look-up table to select pre-computed transmission energies corresponding to said measured characteristic and said reliability level; and
a transmitter for:
transmitting a frame of information at a first transmission energy of said plurality of transmission energies; and
retransmitting said frame of information with a next transmission energy from said plurality of transmission energies when said frame was received in error.

14. The apparatus of claim 13, wherein said control processor pre-computes said transmission energies by having been configured to:
solve for a minimal total energy <E>, an equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
$E_i$ are said transmission energies;
$f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate.

15. An apparatus for retransmission in a communication system, comprising:
a control processor configured to:
determine a plurality of transmission energies in accordance with a predetermined reliability level and at least one characteristic of a communication channel by:
measuring at least one of said characteristic of said communication channel;
utilizing a look-up table to select a predetermined relationship between a frame error rate and a transmission energy corresponding to said measured parameters;
solving for a minimal total energy <E> in accordance with the equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
$E_i$ are said transmission energies,
$f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate; and
a transmitter for:
transmitting a frame of information at a first transmission energy of said plurality of transmission energies; and
retransmitting said frame of information with a next transmission energy from said plurality of transmission energies when said frame was received in error.

16. An apparatus for retransmission in a communication system, comprising:
a control processor configured to:
determine a plurality of transmission energies in accordance with a predetermined reliability level and at least one characteristic of a communication channel by:
determining a relationship between a frame error rate and a transmitting energy;
solving for a minimal total energy <E>, in accordance with the equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
$E_i$ are said transmission energies, and
$f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate; and
a transmitter for:
transmitting a frame of information at a first transmission energy of said plurality of transmission energies; and
retransmitting said frame of information with a next transmission energy from said plurality of transmission energies when said frame was received in error.

17. An apparatus for retransmission in a communication system, comprising:
a control processor configured to:
determine two transmission energies in accordance with a predetermined reliability level and at least one characteristic of a communication channel; and
a transmitter for:
transmitting a frame of information at a first transmission energy of said plurality of transmission energies; and
retransmitting said frame of information with a next transmission energy from said plurality of transmission energies when said frame was received in error.

18. An apparatus for retransmission in a communication system, comprising:

a control processor configured to:
  determine a plurality of transmission energies by solving an equation for estimating a minimum aggregate transmission energy; and
a transmitter for:
  transmitting a frame of information at a first transmission energy of said plurality of transmission energies; and
  retransmitting said frame of information with a next transmission energy from said plurality of transmission energies when said frame was received in error.

19. An apparatus for retransmission in a communication system, comprising:
  a control processor configured to:
    determine a plurality of transmission energies in accordance with a predetermined reliability level and at least one characteristic of a communication channel by:
      measuring said at least one of characteristic of said communication channel; and
      utilizing a look-up table to select pre-computed transmission energies corresponding to said measured characteristic and said reliability level;
    provide a first set of signals indicative of a first transmission energy of said plurality of transmission energies for a frame of information; and
    provide at least one additional set of signals indicative of next transmission energy from said plurality of transmission energies for retransmitting said frame of information when said frame was received in error; and
  a receiver for providing an indication to said control processor whether said frame was received in error.

20. The apparatus of claim 19, wherein said control processor pre-computes said transmission energies by having been configured to:
  solve for a minimal total energy <E>, an equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
  $E_i$ are said transmission energies;
  $f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate.

21. An apparatus for retransmission in a communication system, comprising:
  a control processor configured to:
    determine a plurality of transmission energies in accordance with a predetermined reliability level and at least one characteristic of a communication channel by:
      measuring at least one of said characteristic of said communication channel;
      utilizing a look-up table to select a predetermined relationship between a frame error rate and a transmission energy corresponding to said measured parameters;
    solving for a minimal total energy <E> in accordance with the equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
  $E_i$ are said transmission energies,
  $f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate;
    provide a first set of signals indicative of a first transmission energy of said plurality of transmission energies for a frame of information; and
    provide at least one additional set of signals indicative of next transmission energy from said plurality of transmission energies for retransmitting said frame of information when said frame was received in error; and
  a receiver for providing an indication to said control processor whether said frame was received in error.

22. An apparatus for retransmission in a communication system, comprising:
  a control processor configured to:
    determine a plurality of transmission energies in accordance with a predetermined reliability level and at least one characteristic of a communication channel by:
      determining a relationship between a frame error rate and a transmitting energy;
    solving for a minimal total energy <E>, in accordance with the equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
  $E_i$ are said transmission energies, and
  $f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate;
    provide a first set of signals indicative of a first transmission energy of said plurality of transmission energies for a frame of information; and
    provide at least one additional set of signals indicative of next transmission energy from said plurality of transmission energies for retransmitting said frame of information when said frame was received in error; and a receiver for providing an indication to said control processor whether said frame was received in error.

23. An apparatus for retransmission in a communication system, comprising:

a control processor configured to:
determine two transmission energies in accordance with a predetermined reliability level and at least one characteristic of a communication channel;
provide a first set of signals indicative of a first transmission energy of said plurality of transmission energies for a frame of information; and
provide at least one additional set of signals indicative of next transmission energy from said plurality of transmission energies for retransmitting said frame of information when said frame was received in error; and a receiver for providing an indication to said control processor whether said frame was received in error.

24. An apparatus for retransmission in a communication system, comprising:

a control processor configured to:
determine a plurality of transmission energies by solving an equation for estimating a minimum aggregate transmission energy;
provide a first set of signals indicative of a first transmission energy of said plurality of transmission energies for a frame of information; and
provide at least one additional set of signals indicative of next transmission energy from said plurality of transmission energies for retransmitting said frame of information when said frame was received in error; and a receiver for providing an indication to said control processor whether said frame was received in error.

25. An apparatus for retransmission in a communication system, comprising:

a control processor configured to:
determine a plurality of transmission energies in accordance with a predetermined reliability level and at least one characteristic of a communication channel by:
measuring said at least one of characteristic of said communication channel; and
utilizing a look-up table to select pre-computed transmission energies corresponding to said measured characteristic and said reliability level;

a receiver for providing an indication to said control processor whether said frame has been received in error; and a transmitter for:
transmitting a frame of information at a first transmission energy of said plurality of transmission energies; and
retransmitting said frame of information with a next transmission energy from said plurality of transmission energies when said frame was received in error.

26. The apparatus of claim 25, wherein said control processor pre-computes said transmission energies by having been configured to:

solve for a minimal total energy <E>, an equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
$E_i$ are said transmission energies;
$f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate.

27. An apparatus for retransmission in a communication system, comprising:

a control processor configured to:
determine a plurality of transmission energies in accordance with a predetermined reliability level and at least one characteristic of a communication channel by:
measuring at least one of said characteristic of said communication channel;
utilizing a look-up table to select a predetermined relationship between a frame error rate and a transmission energy corresponding to said measured parameters;
solving for a minimal total energy <E> in accordance with the equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
$E_i$ are said transmission energies,
$f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate;

a receiver for providing an indication to said control processor whether said frame has been received in error; and a transmitter for:
transmitting a frame of information at a first transmission energy of said plurality of transmission energies; and
retransmitting said frame of information with a next transmission energy from said plurality of transmission energies when said frame was received in error.

28. An apparatus for retransmission in a communication system, comprising:
a control processor configured to:
determine a plurality of transmission energies in accordance with a predetermined reliability level and at least one characteristic of a communication channel by:
determining a relationship between a frame error rate and a transmitting energy;
solving for a minimal total energy <E>, in accordance with the equation:

$$\langle E \rangle = E_1 + f(E_1) \cdot E_2 + f(E_1) \cdot f(E_2) \cdot E_3 + \ldots + E_N \prod_{i=1}^{N-1} f(E_i),$$

where:
$E_i$ are said transmission energies, and
$f(E_i)$ are frame error rates corresponding to said transmission energies $E_i$;
subject to constraint:

$$T_{FER} = \prod_{i=1}^{N} f(E_i),$$

where: $T_{FRR}$ is a target frame error rate; and
wherein said reliability level corresponds to said target frame error rate;
a receiver for providing an indication to said control processor whether said frame has been received in error; and
a transmitter for:
transmitting a frame of information at a first transmission energy of said plurality of transmission energies; and
retransmitting said frame of information with a next transmission energy from said plurality of transmission energies when said frame was received in error.

29. An apparatus for retransmission in a communication system, comprising:
a control processor configured to:
determine two transmission energies in accordance with a predetermined reliability level and at least one characteristic of a communication channel;
a receiver for providing an indication to said control processor whether said frame has been received in error; and
a transmitter for:
transmitting a frame of information at a first transmission energy of said plurality of transmission energies; and
retransmitting said frame of information with a next transmission energy from said plurality of transmission energies when said frame was received in error.

30. An apparatus for retransmission in a communication system, comprising:
a control processor configured to:
determine a plurality of transmission energies by solving an equation for estimating a minimum aggregate transmission energy;
a receiver for providing an indication to said control processor whether said frame has been received in error; and
a transmitter for:
transmitting a frame of information at a first transmission energy of said plurality of transmission energies; and
retransmitting said frame of information with a next transmission energy from said plurality of transmission energies when said frame was received in error.

* * * * *